M. PRICE.
AUTOMOBILE HOIST.
APPLICATION FILED DEC. 16, 1920.

1,381,592.

Patented June 14, 1921.
2 SHEETS—SHEET 1.

Matt Price
INVENTOR

WITNESSES

BY

ATTORNEY

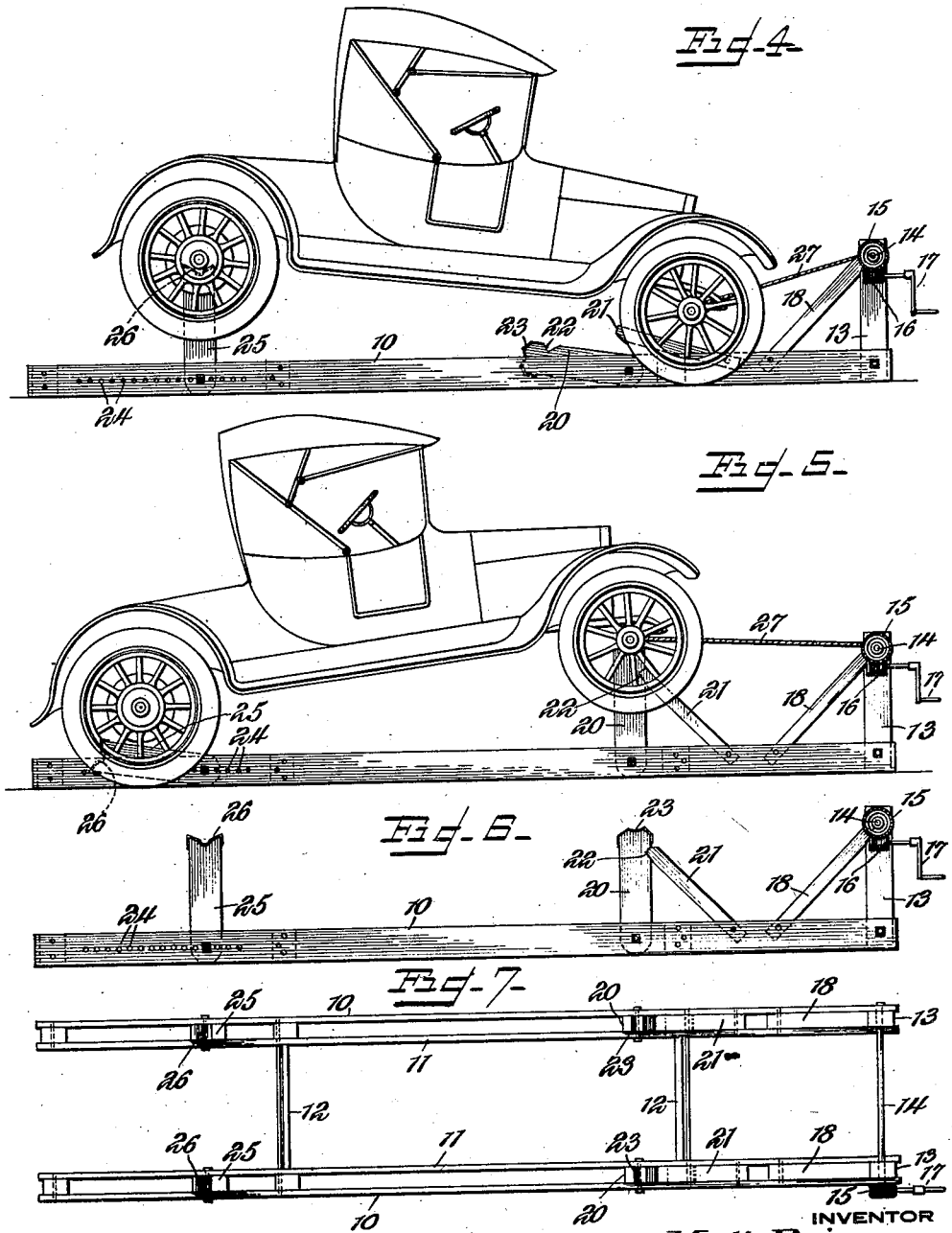

UNITED STATES PATENT OFFICE.

MATT PRICE, OF SALINA, KANSAS.

AUTOMOBILE-HOIST.

1,381,592. Specification of Letters Patent. Patented June 14, 1921.

Application filed December 16, 1920. Serial No. 431,113.

*To all whom it may concern:*

Be it known that I, MATT PRICE, a citizen of the United States, residing at Salina, in the county of Saline and State of Kansas, have invented a new and useful Automobile-Hoist, of which the following is a specification.

The present invention relates to hoists which are manually operable to elevate motor vehicles.

Objects of the invention are to provide a hoist which is readily adaptable to all sizes of wheel bases, which is collapsible so as to take up a minimum amount of room when not in use, which is capable of elevating either the rear or front end of a motor vehicle or both ends simultaneously, which is easily worked, and sturdy of construction.

The invention provides a hoist which is best adapted for automobile workshops and may be placed anywhere upon the floor so that an automobile may drive over the hoist to be thereafter raised. The hoist supports the automobile by its engagement with the axles inside of the wheels so as to leave the wheels free, enabling any or all of the tires to be removed or repaired or the wheels themselves to be removed. Automobiles or the like may be raised from a few inches to as high as twenty-eight inches from the floor, giving sufficient clearance to enable a workman to work at his ease upon any part of the under mechanism of the machine. The hoist does away with the necessity of a pit in a workshop, and this is a great advantage since many workmen have been overcome by gases when working in pits, and further since pits collect refuse of all kinds and are likely at any time to lead to falling of the workmen with consequent injury.

By the use of the present device it is possible to lift the rear end of any automobile to a sufficient height to permit the removal of the rear axle assembly and drive shaft without marring or mutilating the fenders or body of the automobile by chains or cables.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:

Fig. 4 is an elevation showing the automobile elevated at the rear end only.

Fig. 5 is an elevation showing the automobile elevated at the front end only.

Fig. 6 is an elevation showing the hoist in the same position as that of Fig. 3, but with the automobile omitted.

Fig. 7 is a top plan view of the same.

Figure 1:
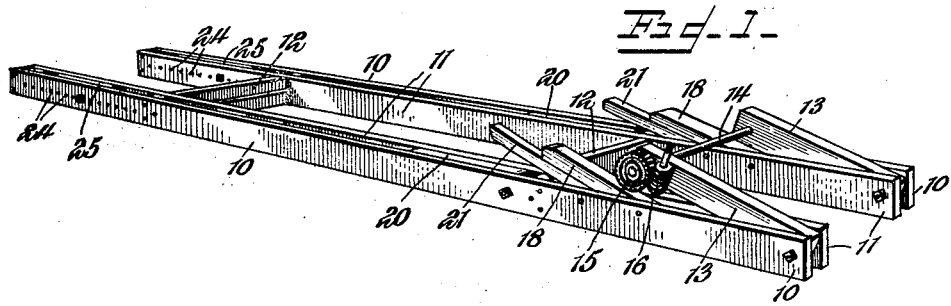
Figure 1 is a perspective view of the improved hoist.
Figure 2:
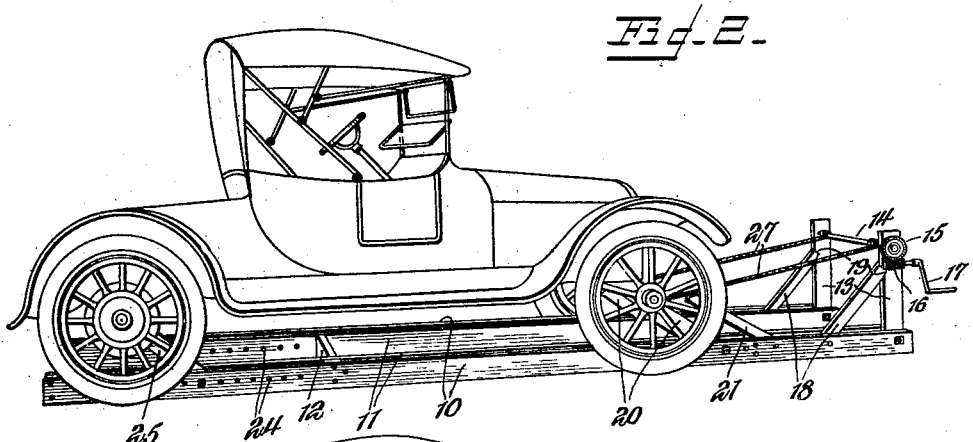
Fig. 2 is a perspective view of the improved hoist showing the machine in position and about to be elevated.
Figure 3:
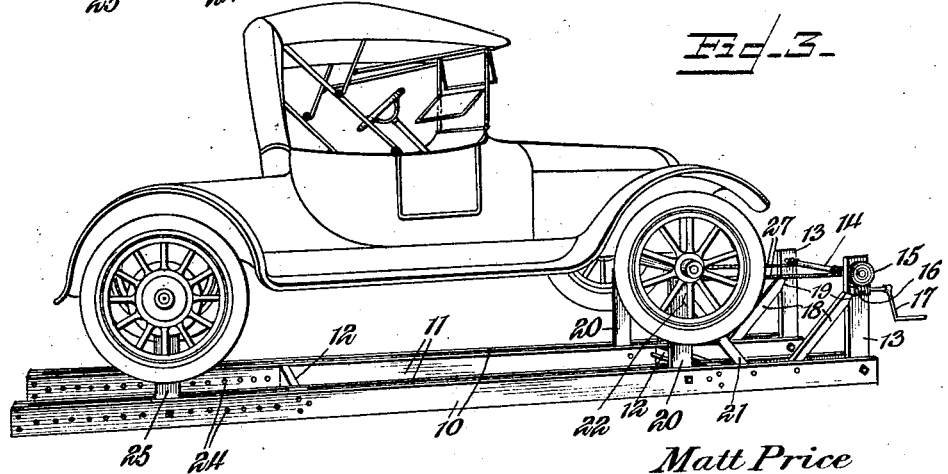
Fig. 3 is a similar view showing an automobile hoisted to its most elevated position.

The hoist has a base or frame which includes two parallel beams each comprising spaced bars 10, 11 secured to each other. The two beams are connected by cross bars 12. At one end of the hoist two standards 13 are swingably mounted. Each standard 13 is pivoted on a bolt or similar element extending between two of the bars 10, 11. The standards at their upper ends mount a shaft 14 whereby the two standards swing together. At one end of the shaft 14 a worm gear 15 is secured and one of the standards supports a worm 16 meshing with said gear. The shaft of the worm 16 is suitably shaped at one end to receive a crank 17 whereby upon manual rotation of said crank the shaft 14 is slowly rotated. As seen in Fig. 1, the two standards may fold down close against the beams. When in their raised position they are braced by arms 18 fitting into notches 19 in the sides of the standards. Each arm 18 is pivoted at its lower end between the bars of each beam whereby the arms may be folded down underneath the standards.

A pair of pivoted lifting members 20 are provided at opposite points on the beams, these members being receivable between the bars of each beam, as shown in Fig. 1. Each lifting member is notched as at 22 near its upper end to receive the end of a pivotally mounted bracing arm 21. It will be noted that the braces 18 and 21 when active make angles approximately 45° and 135°, respectively, with the beams upon which they are mounted. At the upper ends each supporting member is appropriately shaped as by hollowing out so that they may fit under the front axle of an automobile to support the latter. If the members are of wood, their upper axle-engaging ends should be protected by metal straps. The supporting members 20 swing about axes which are fixed relative to the standards 13.

Near the other end of the hoist the beams are transversely perforated for a considerable portion of their length as indicated at 24. These perforations receive the bolts or pins providing pivots for a second pair of supporting members 25. The upper end of each member 25 is appropriately shaped to fit under the rear axle of an automobile and is protected by a metallic strap. The provision of the perforations 24 allows the shifting of the position of the supporting members 25 for a considerable distance along the beams. In this way, the difference in the wheel bases of various machines is accommodated.

The manner in which the hoist is used is as follows: The automobile is driven over the hoist when the latter is in the position of Fig. 1. Then the cable 27 is secured to the front axle of the machine, the other end of the cable being connected to the shaft 14. If it is desired to raise the forward end of the car, the supports 20 will be swung under the machine until their upper ends engage with the front axle, then the crank 17 will be turned, whereupon the cable will be wrapped about the shaft 14, forcing the car to move forwardly and swinging its forward end upwardly by reason of the pivoting of the members 20. If the rear axle is to be elevated, the members 25 will be engaged with the rear axle while the members 20 will be left in their housed position between the bars 10, 11. If the entire machine is to be hoisted, both of the members 25 will be engaged with the axles and the elevating done as before. When the hoisting is to be done the standards 13 are prevented from swinging in the direction of the machine by the braces 18. The supporting members 20 are prevented from moving toward the standards 13 by the braces 21. The members 25 do not have braces since they are adjustable for a considerable length along the beams; nevertheless braces might be employed if desired. The hoist is strongly constructed so as to give a maximum of service and is easily operated, adapted for all types of motor vehicles, occupies a minimum of room, and is relatively inexpensive to manufacture. When an automobile is lifted by the present device, all the underneath working parts are easy to get at while at the same time the entire hoist may be moved about to any part of the shop so as to enable the workman to get the best light on the job.

What is claimed is:—

1. In a hoist, a base, a pair of pivotally mounted supporting members swingable independently of each other in planes longitudinal of the base, a second pair of swingable independent supporting members mounted on the base, and means at one base end whereby an automobile may be pulled toward that end after either or both axles are brought into engagement with the corresponding pairs of supporting members.

2. In a hoist, a base including two parallel beams each composed of a pair of spaced joined bars, a pair of pivotally mounted supporting members swingable independently of each other, in planes longitudinal of the base, a second pair of swingable independent supporting members mounted on the base, all of said supporting members being foldable within the beams, and means at one base end whereby an automobile may be pulled toward that end after either or both axles are brought into engagement with the corresponding pairs of supporting members, said means likewise being foldable down against the base.

3. In a hoist, a base including two parallel beams each composed of a pair of spaced joined bars, a pair of pivotally mounted supporting members swingable independently of each other in planes longitudinal of the base, bracing arms swingably mounted on the base and engaging said members when upright to prevent swinging movement in one direction, a second pair of swingable independent supporting members mounted on the base, all of said supporting members being foldable within the beams and the bracing arms being foldable down against the base, and means at one base end whereby an automobile may be pulled toward that end after either or both axles are brought into engagement with the corresponding pairs of supporting members, said means likewise being foldable down against the base.

4. In a hoist, a base, a pair of pivotally mounted supporting members swingable independently of each other in planes longitudinal of the base, a second pair of swingable independent supporting members mounted on the base, means whereby the positions of the pivots of the members of said second pair may be shifted longitudinally of the base to accommodate the hoist to machines of various wheel bases, and means at one base end whereby an automobile may be pulled toward that end after either or both axles are brought into engagement with the corresponding pairs of supporting members.

5. In a hoist, a base including two parallel beams each composed of a pair of spaced joined bars, a pair of pivotally mounted supporting members swingable independently of each other in planes longitudinal of the base, a second pair of swingable independent supporting members mounted on the base, all of said supporting members being foldable within the beams, means whereby the positions of the pivots of the members of said second pair may be shifted longitudinally of the base to accommodate the hoist to machines of various wheel bases, and means at one base end whereby an automobile may be pulled toward that end after either or both axles are brought into engagement with the corresponding pairs of supporting members, said means likewise being foldable down against the base.

In testimony that I claim the foregoing as my own, I have hereto affixed my signature.

MATT PRICE.